Oct. 9, 1923.
P. H. SPRACKLEN
1,470,201
COMPENSATING HINGE JOINT FOR ARTIFICIAL LIMBS
Filed Aug. 31, 1920
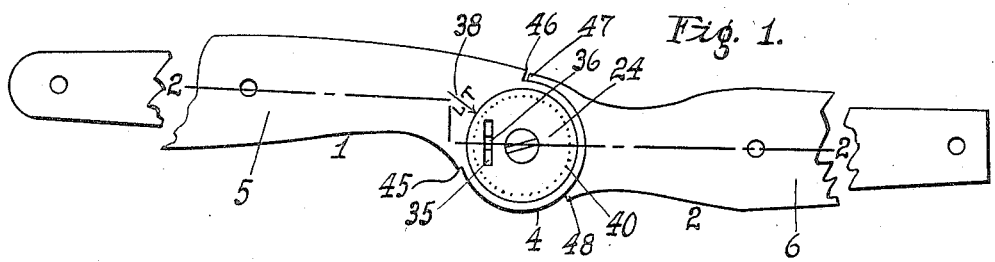
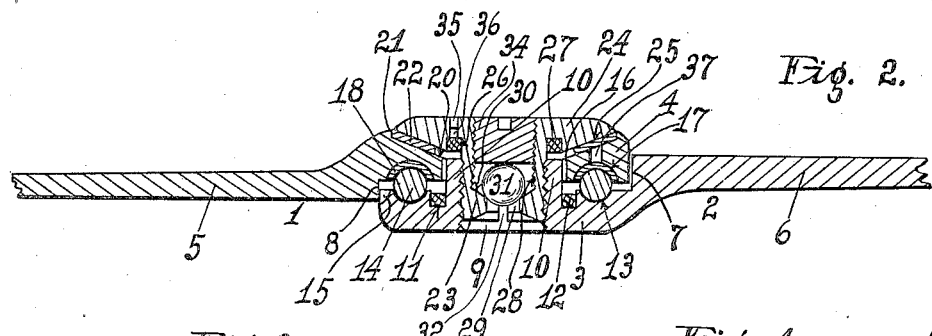
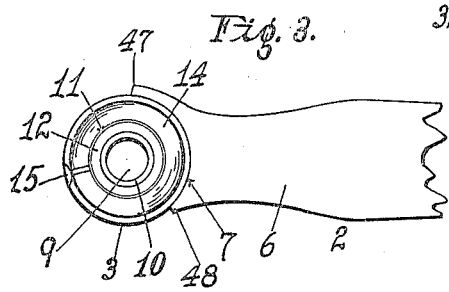
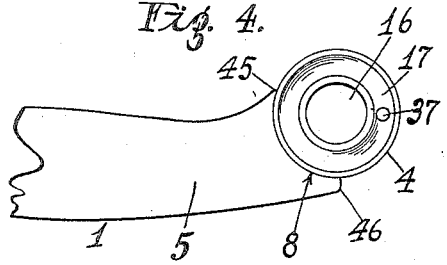
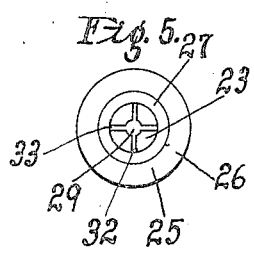
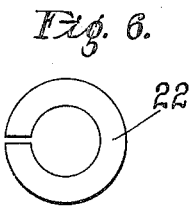
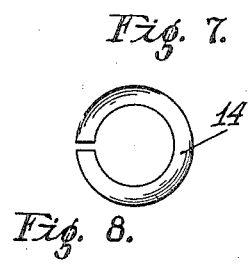
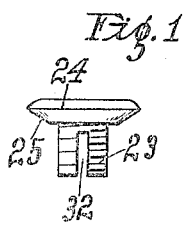
Inventor
Paul H. Spracklen.
By Harry C. Schroeder
Attorney Patented Oct. 9, 1923.

1,470,201

UNITED STATES PATENT OFFICE.

PAUL H. SPRACKLEN, OF OAKLAND, CALIFORNIA.

COMPENSATING HINGE JOINT FOR ARTIFICIAL LIMBS.

Application filed August 31, 1920. Serial No. 407,286.

*To all whom it may concern:*

Be it known that I, PAUL H. SPRACKLEN, a citizen of the United States, residing at Oakland, in the county of Alameda and State of California, have invented certain new and useful Improvements in Compensating Hinge Joints for Artificial Limbs, of which the following is a specification.

My invention is an improved hinge joint, particularly applicable to the knee or other joints of artificial limbs.

My hinge joint is designed and constructed to give the longest and most satisfactory wearing service possible and without oiling more than once a week. The bearing parts of my joint fit tightly in their seats so that there is no wear on said seats, and the bearing parts are replaceable and always fit perfectly in their non-wearing seats.

Other novel features of my invention will appear from the following description:

Referring to the annexed drawing in which my invention is illustrated and which forms a part of this specification, Figure 1 is a side view of my hinge joint.

Figure 2 is a sectional view of my hinge joint taken on line 2—2 of Figure 1.

Figure 3 is a side view of one hinge member of my hinge joint.

Figure 4 is a side view of the other hinge member of my joint.

Figure 5 is an end view of the end thrust bearing and securing screw.

Figure 6 is a plan view of the conical end thrust bearing ring.

Figure 7 is a plan view of the main cylindrical bearing ring.

Figure 8 is a plan view of the main grooved bearing ring.

Figure 9 is a plan view of one of the felt oil rings.

Figure 10 is a side view of the end thrust bearing and securing screw.

My hinge joint includes two hinge members 1 and 2, on one end of which are formed hinge knuckles 3 and 4 respectively which are offset from the shanks 5 and 6 of said members; curved transverse walls 7 and 8, concentric with the center of said knuckles, being formed at the knuckle end of said members respectively. A central threaded opening 9 is provided in the knuckle 3 which is extended through a sleeve 10 extending inwardly from said knuckle. The inner side of knuckle 3 is provided with a cencentric annular groove 11 at the base of the sleeve 10 in which groove fits a felt oil ring 12. The inner side of said knuckle is provided with a concentric annular bearing ring groove 13 which surrounds the groove 11 and is arcuate in cross section to receive a split cylindrical bronze bearing ring 14. The groove 13 is .002 of an inch smaller than the ring 14 so that said ring fits tightly in the groove and prevents wearing of the groove. The knuckle 3 is provided with a notch 15 in its inner edge opposite which the split in the ring 14 is located. The knuckle 4 is provided with a central opening 16 into which extends the sleeve 10. Said knuckle is provided with an annular groove 17 surrounding said opening 16, said groove being arcuate in cross section to receive an annular grooved steel bearing ring 18 of similar cross section in which ring fits the bearing ring 14 which turns in said grooved ring. In the outside of the knuckle 4 is formed an inwardly converging conical seat 20 and an annular concentric shoulder 21 at the outside of said seat, which seat receives a flat split conical bronze end-thrust bearing ring 22. A screw 23 formed on the under side of its head 24, with a conical end thrust bearing member 25, screws into the threaded opening 9 in the knuckle 3 with said bearing member 25 engaging the bearing ring 22, the pressure of said bearing member against said ring causing the ring to expand tightly into engagement with the shoulder 21, so that it will not turn, and causing the bearing member to turn on the ring. The head 24 of the screw 23 is formed in its under side with an annular groove 26 between the shank of the screw and the bearing member 25. A felt oil ring 27 fits in the groove 26. The screw 23 has an internally threaded bore 28 extending from its head end and a bore 29 extending from the inner end of the bore 28 through the shank end of the screw. The inner end of the bore 28 is formed with a conical seat 30 on which rests a steel ball 31. Diametrical slits 32 and 33 are cut in the shank of the screw 23 at 90° apart to enable the screw to expand and bind against the threaded opening 9 under the action of a screw plug 34, seated in the threaded bore 28, and the ball 31, when said plug is screwed against said ball and the ball forced against its conical seat 30, thus locking the screw 23 in the opening 9 and the knuckles 3 and 4 in hinging relation. The head 24 of the screw 23 is provided with a groove 35 in its outer face to receive a screw driver for turning the screw.

An oil aperture 36 leads through the screw head 24 into the groove 26 through which aperture oil may be introduced into the oil ring 27. An aperture 37 extends through the knuckle 4 from the seat 20 to the seat 17 through which aperture a tool may be introduced to eject the bearing ring 18 from the seat 17 when taking the joint apart. On the knuckle end of the hinge member shank 5 is an arrow 38 extending radially of the center of the joint to a point corresponding to the outer edge of the screw head 24, and at the left and right side of said arrow are the letters L and T respectively, the letter L indicating that the joint is made loose when the screw 23 is turned to the left and the letter T indicating that the joint is tightened when the screw is turned to the right. A series of graduations 40 are arranged in a circle on the outside of the screw head 24 near the outer edge thereof, to which graduations the arrow 38 successively points, when the screw 23 is turned to the right or left, said graduations being spaced at such distance apart that when the screw is turned either to the right or to the left so that one graduation opposite said arrow is turned away from said arrow and the next graduation brought opposite said arrow, the end thrust bearing member 25 is moved against or away from the bearing ring 22 at a distance substantially .001 of an inch, and the joint is correspondingly tightened or loosened.

When the knuckles 3 and 4 are assembled the wall 7 of hinge member 2 overlaps the inner edge of the knuckle 4 and the wall 8 of the hinge member 1 overlaps the inner edge of the knuckle 3 and prevent the entrance of dirt into the joint.

At the knuckle end of the shank 5 of hinge member 1 and at the respective ends of the wall 8 of said member are formed shoulders 45 and 46. At the knuckle end of the shank 6 of hinge member 2 and at the respective ends of the wall 7 of said member are formed shoulders 47 and 48. The shoulders 46 and 47 engage each other and limit the opening of the hinge members 1 and 2 so that they extend straight in the same direction or in the position of the joint when holding the members of the artificial limb straight. The shoulders 45 and 48 engage each other to limit the closing movement of the hinge members 1 and 2 at an acute angle to each other or in the position they assume when holding the members of the artificial limb at a corresponding angle.

Oil may be introduced into the felt oil ring 11 through the notch 15 and the split in the bearing ring 22.

The oil ring 12 oils the bearing surfaces of the bearing rings 14 and 18. The oil ring 27 oils the bearing surfaces of the bearing member 25 and the bearing ring 22.

It is to be noted that there is no wear on either knuckle, the wear being entirely on the rings 13 and 18 and the ring 22 and bearing surface 25 of screw 23. All of these bearing parts are replaceable, the bearing part 25 being replaceable by replacing the screw 23.

Having described my invention, I claim:

1. A hinge joint including a pair of hinge members, a knuckle on one end of each member, one knuckle having a central threaded opening, a cylindrical bearing ring seated tightly in one of said knuckles, a grooved bearing ring seated tightly in the other knuckle in which grooved ring said cylindrical ring turns, a screw extending through one knuckle and engaging the thread of the threaded opening in the other knuckle, and an end thrust bearing between the head of said screw and the adjacent knuckle.

2. A hinge joint including a pair of hinge members, a knuckle on one end of each of said members, a bearing between said knuckles, one of said knuckles being provided with a threaded opening, a screw extending loosely through the other knuckle and engaging said threaded opening, said other knuckle being formed with a conical seat in its outer side and an annular shoulder surrounding said seat, a conical split bearing ring fitting in said seat, and a conical bearing surface on the under side of the head of said screw engaging said conical bearing ring.

3. A hinge joint, a pair of hinge members, a knuckle at one end of each hinge member, means for hinging said knuckles together, replaceable bearings for said knuckles, and means for oiling said bearing.

4. A hinge joint, a pair of hinge members, a knuckle at one end of each hinge member, means for hinging said knuckles together, replaceable bearings for said knuckles, which bearings take up all the wear of the joint, and means for oiling said bearings.

5. A hinge joint including a pair of hinge members, a knuckle at one end of each member, means for hinging said knuckles together, a bearing between said knuckles, one of said knuckles being provided with an annular groove within said bearing, and an oil ring fitting in said annular groove.

6. A joint including a pair of hinge members, a knuckle at one end of each member, means for hinging said knuckles together, one of said knuckles having a seat in its inner side, a split cylindrical bearing ring fitting tightly in said seat, the other knuckle overlapping the inner edge of said knuckle in which said ring is seated, said inner edge of said knuckle having a notch opposite the split in said ring, said knuckle having said ring seat having an annular groove within said seat, an oil ring in said groove, the other knuckle having a bearing for said bearing ring.

7. A joint including a pair of hinge members, a knuckle on each member, means for pivoting said knuckles together, a split cylindrical bearing ring, an annular seat for said ring in the inside of one of said knuckles, said seat being slightly smaller in diameter than said ring so that said ring will fit tightly in said seat, the other knuckle having an annular bearing seat, a grooved bearing ring of slightly larger diameter than said seat fitting tightly in said seat and said bearing ring fitting and turning in said groove bearing ring.

8. A joint including a pair of hinge members, a knuckle on each member, means for pivoting said knuckles together, a split cylindrical bearing ring, an annular seat for said ring in the inside of one of said knuckles, said seat being slightly smaller in diameter than said ring so that said ring will fit tightly in said seat, the other knuckle having an annular bearing seat, a grooved bearing ring of slightly larger diameter than said seat fitting tightly in said seat and said bearing ring fitting and turning in said groove bearing ring, the knuckle in which said grooved ring seat is located having an opening extending from its outer side to said seat through which opening a tool may be inserted to eject said grooved ring.

9. A hinge joint including a pair of hinge members, a knuckle on one end of each of said members, a bearing between said knuckles, one of said knuckles being provided with a threaded opening, a screw extending loosely through the other knuckle and engaging said threaded opening, said other knuckle being formed with a conical seat in its outer side and an annular shoulder surrounding said seat, a conical split bearing ring fitting in said seat, and a conical bearing surface on the under side of the head of said screw engaging said conical bearing ring, the head of said screw having an annular groove between the screw shank and said conical end thrust bearing surface, and an oil ring fitting in said groove.

10. A hinge joint including a pair of hinge members, a knuckle on one end of each of said members, a bearing between said knuckles, one of said knuckles being provided with a threaded opening, a screw extending loosely through the other knuckle and engaging said threaded opening, said other knuckle being formed with a conical seat in its outer side and an annular shoulder surrounding said seat, a conical split bearing ring fitting in said seat, and a conical bearing surface on the under side of the head of said screw engaging said conical bearing ring, the head of said screw having an annular groove between the screw shank and said conical end thrust bearing surface, and an oil ring fitting in said groove, the head of said screw having an aperture extending from its outside to said oil ring groove.

11. A hinge joint including a pair of hinge members, a knuckle on one end of each of said members, a bearing between said knuckles, one of said knuckles being provided with a threaded opening, a screw extending loosely through the other knuckle and engaging said threaded opening, said other knuckle being formed with a conical split bearing ring fitting in said seat, a conical bearing surface on the under side of the head of said screw engaging said conical bearing ring, graduations arranged in a circle on the outside of the head of said screw, near the outer edge thereof, and an arrow on the knuckle adjacent said screw pointing to said graduations.

12. A hinge joint including a pair of hinge members, a knuckle on one end of each of said members, a bearing between said knuckles, one of said knuckles being provided with a threaded opening, a screw extending loosely through the other knuckle and engaging said threaded opening, said other knuckle being formed with a conical split bearing ring fitting in said seat, a conical bearing surface on the under side of the head of said screw engaging said conical bearing ring, graduations arranged in a circle on the outside of the head of said screw, near the outer edge thereof, an arrow on the knuckle adjacent said screw pointing to said graduations, and the letters T and L on said knuckles at the right and left sides of said arrow respectively.

13. A hinge joint including a pair of hinge members, a knuckle on one end of each of said members, a bearing between said knuckles, one of said knuckles being provided with a threaded opening, a screw extending loosely through the other knuckle and engaging said threaded opening, said other knuckle being formed with a conical seat in its outer side and an annular shoulder surrounding said seat, a conical split bearing ring fitting in said seat, a conical bearing surface on the under side of the head of said screw engaging said conical bearing ring, the head of said screw having an annular groove between the screw shank and said conical end, thrust bearing surface, an oil ring in said groove, the head of said screw having a screw driver groove in its outside surface, and an aperture leading from said screw driver groove to said oil ring groove.

14. A hinge joint including a pair of hinge members, a knuckle on each hinge member, a bearing between said knuckles, one knuckle having a threaded opening, a screw extending loosely through said other knuckle and engaging said threaded opening, an end thrust bearing between the head of said screw and said other knuckle, and means for binding said screw in the thread in said opening.

15. A hinge joint including a pair of hinge members, a knuckle on each hinge member, a bearing between said knuckles, one knuckle having a threaded opening, a screw extending loosely through said other knuckle and engaging said threaded opening, an end thrust bearing between the head of said screw and said other knuckle, means for binding said screw in the thread in said opening, said screw having a threaded bore extending from its head end, and a bore leading from said threaded bore through the shank end of said screw, said screw being split, the inner end of said threaded bore being conical, a ball resting on said conical seat, and a plug screwed into said threaded bore against said ball to expand the screw.

16. A hinge joint including a pair of hinge members, a knuckle on each hinge member, a bearing between said knuckles, one knuckle having a threaded opening, a screw extending loosely through said other knuckle and engaging said threaded opening, an end thrust bearing between the head of said screw and said other knuckle, the head of said screw having an annular groove in its under side between said end thrust bearing and the screw shank, and an oil ring fitting in said groove.

In testimony whereof I affix my signature.

PAUL H. SPRACKLEN.